(12) United States Patent
Rajendran et al.

(10) Patent No.: US 11,693,107 B2
(45) Date of Patent: Jul. 4, 2023

(54) SYSTEM, DEVICE AND METHOD FOR EFFICIENT MIMO RADAR

(71) Applicant: Steradian Semiconductors Private Limited, Bengaluru (IN)

(72) Inventors: Gireesh Rajendran, Bengaluru (IN); Ankit Sharma, Bengaluru (IN); Sai Gunaranjan Pelluri, Bengaluru (IN); Apu Sivadas, Bengaluru (IN)

(*) Notice: Subject to any disclaimer, the term of this patent is extended or adjusted under 35 U.S.C. 154(b) by 245 days.

(21) Appl. No.: 17/122,020

(22) Filed: Dec. 15, 2020

(65) Prior Publication Data

US 2022/0099819 A1 Mar. 31, 2022

(51) Int. Cl.
*G01S 13/58* (2006.01)
*G01S 7/35* (2006.01)

(52) U.S. Cl.
CPC ............ *G01S 13/584* (2013.01); *G01S 7/354* (2013.01); *G01S 7/356* (2021.05)

(58) Field of Classification Search
CPC ..... G01S 2013/0245; G01S 2013/0254; G01S 7/354; G01S 7/356; G01S 13/931; G01S 13/584; G01S 13/343; G01S 13/345; G01S 13/347
USPC .................................................. 342/112, 107
See application file for complete search history.

(56) References Cited

U.S. PATENT DOCUMENTS

| | | | | | |
|---|---|---|---|---|---|
| 3,008,136 A | * | 11/1961 | Mccoy | .................... | G05D 3/121 318/280 |
| 3,818,477 A | * | 6/1974 | Odams | ...................... | H03L 7/06 342/396 |
| 4,430,148 A | * | 2/1984 | Schaefer | ........... | B29C 66/83511 156/580.2 |
| 4,968,968 A | * | 11/1990 | Taylor | .................... | G01S 7/4008 342/174 |
| 5,334,982 A | * | 8/1994 | Owen | .................... | G01S 13/765 342/36 |
| 5,847,661 A | * | 12/1998 | Ricci | ................. | G08G 1/096716 340/447 |
| 5,892,477 A | * | 4/1999 | Wehling | ..................... | G01S 7/36 342/18 |
| 6,144,332 A | * | 11/2000 | Reindl | ............... | G06K 19/0675 342/42 |
| 6,157,321 A | * | 12/2000 | Ricci | ....................... | G08G 1/163 340/928 |
| 6,405,147 B1 | * | 6/2002 | Fera | .......................... | H04B 1/62 702/182 |

(Continued)

*Primary Examiner* — Erin F Heard
*Assistant Examiner* — Michael W Justice

(57) ABSTRACT

According to an aspect, a radar system comprising a transmitter operative to transmit a first set of chirps on a single transmit antenna and a second set of chirps on a plurality of transmit antennas, in that, the first set of chirps forming a first part of a chirp frame and the second set of chirps forming a second part of the chirp frame, a first receiver segment operative to generate a first set of parameters from a first set of received chirps that is reflection of the first set of chirps from one or more objects and a second segment operative to generate a second set of parameters from a second set of received chirps that is reflection of the second set of chirps from the one or more objects part of the received chirp frame and the first set of parameters, wherein, first set of parameters and second set of parameters comprise at least one of range doppler and angle of one or more objects.

8 Claims, 8 Drawing Sheets

(56) References Cited

U.S. PATENT DOCUMENTS

| | | | |
|---|---|---|---|
| 6,686,871 B2* | 2/2004 | Rohling | G01S 13/524 342/127 |
| 7,430,257 B1* | 9/2008 | Shattil | H04B 1/707 375/349 |
| 8,848,844 B2* | 9/2014 | Hyll | H04L 25/0206 375/343 |
| 9,116,237 B2* | 8/2015 | Zhou | G01S 13/84 |
| 9,258,161 B2* | 2/2016 | Jalloul | H04L 27/2613 |
| 9,444,514 B2* | 9/2016 | Hadani | H04L 25/0212 |
| 9,668,148 B2* | 5/2017 | Hadani | H04L 5/0023 |
| 9,867,065 B2* | 1/2018 | Hadani | H04B 7/0626 |
| 10,034,184 B2* | 7/2018 | Hadani | H04L 25/022 |
| 10,048,353 B2* | 8/2018 | Vogt | G01S 13/325 |
| 10,097,287 B1* | 10/2018 | Schat | G01S 7/354 |
| 10,126,418 B1* | 11/2018 | Campbell | G01S 13/931 |
| 10,291,436 B2* | 5/2019 | Dutz | H04L 1/0059 |
| 10,386,470 B2* | 8/2019 | Zivkovic | G01S 13/42 |
| 10,389,568 B1* | 8/2019 | Shattil | H04L 27/2636 |
| 10,401,495 B2* | 9/2019 | Crouch | G01S 17/26 |
| 10,481,696 B2* | 11/2019 | Molchanov | G01S 7/0234 |
| 10,530,529 B2* | 1/2020 | Küchler | H04L 1/0071 |
| 10,641,882 B2* | 5/2020 | Kishigami | G01S 13/106 |
| 10,681,568 B1* | 6/2020 | Hadani | H04W 24/02 |
| 10,684,352 B2* | 6/2020 | El Assaad | G08G 1/22 |
| 10,718,860 B2* | 7/2020 | Santra | G01S 13/584 |
| 10,775,489 B2* | 9/2020 | Rao | G01S 13/282 |
| 10,778,492 B1* | 9/2020 | Shattil | H04J 13/0003 |
| 10,823,819 B2* | 11/2020 | Loesch | G01S 13/42 |
| 10,827,528 B2* | 11/2020 | Mukherjee | H04L 5/0048 |
| 10,996,313 B2* | 5/2021 | Goswami | G01S 7/415 |
| 11,002,843 B2* | 5/2021 | Akamine | G01S 13/87 |
| 11,025,468 B1* | 6/2021 | Shattil | H04J 11/0093 |
| 11,041,954 B2* | 6/2021 | Crouch | G01S 17/89 |
| 11,054,516 B2* | 7/2021 | Wu | G01S 7/354 |
| 11,061,127 B2* | 7/2021 | Klotzbuecher | G01S 13/726 |
| 11,119,203 B2* | 9/2021 | Iida | G01S 13/931 |
| 11,366,211 B2* | 6/2022 | Rao | G01S 13/343 |
| 11,422,249 B2* | 8/2022 | Roger | G01S 13/584 |
| 2003/0156057 A1* | 8/2003 | Rohling | G01S 7/288 342/131 |
| 2010/0098042 A1* | 4/2010 | Dent | H04J 13/004 370/347 |
| 2010/0311354 A1* | 12/2010 | Stayton | G08G 5/0008 455/90.1 |
| 2013/0170590 A1* | 7/2013 | Hyll | H04L 27/2686 375/343 |
| 2014/0184447 A1* | 7/2014 | Zhou | G01S 13/84 342/127 |
| 2015/0063321 A1* | 3/2015 | Sadek | H04L 5/0062 370/336 |
| 2015/0117395 A1* | 4/2015 | Hadani | H04W 24/02 370/330 |
| 2016/0124075 A1* | 5/2016 | Vogt | G01S 13/536 342/13 |
| 2016/0259037 A1* | 9/2016 | Molchanov | G06V 40/28 |
| 2016/0381576 A1* | 12/2016 | Hadani | H04L 27/366 370/330 |
| 2017/0248692 A1* | 8/2017 | Zivkovic | G01S 13/42 |
| 2017/0276784 A1* | 9/2017 | Manku | G01S 13/74 |
| 2017/0303146 A1* | 10/2017 | Hadani | H04L 27/2639 |
| 2018/0136324 A1* | 5/2018 | Klotzbuecher | G01S 7/354 |
| 2018/0172813 A1* | 6/2018 | Rao | G01S 13/343 |
| 2018/0242170 A1* | 8/2018 | Hadani | H04L 27/366 |
| 2018/0254925 A1* | 9/2018 | Dutz | H04B 1/7183 |
| 2018/0259632 A1* | 9/2018 | Kishigami | G01S 7/2921 |
| 2019/0011532 A1* | 1/2019 | Loesch | G01S 13/42 |
| 2019/0011558 A1* | 1/2019 | Crouch | G01S 7/4866 |
| 2019/0056478 A1* | 2/2019 | Millar | H04B 1/69 |
| 2019/0074930 A1* | 3/2019 | Küchler | G01S 11/08 |
| 2019/0148829 A1* | 5/2019 | Ananth | H04B 17/21 342/174 |
| 2019/0195982 A1* | 6/2019 | El Assaad | G01S 19/03 |
| 2019/0212428 A1* | 7/2019 | Santra | H03L 7/06 |
| 2019/0212430 A1* | 7/2019 | Akamine | G01S 13/87 |
| 2019/0219683 A1* | 7/2019 | Fang | G01S 7/35 |
| 2019/0235066 A1* | 8/2019 | Iida | G01S 13/003 |
| 2019/0271776 A1* | 9/2019 | Davis | G01S 13/931 |
| 2019/0285725 A1* | 9/2019 | Roger | G01S 13/584 |
| 2019/0310358 A1* | 10/2019 | Lee | G01S 13/42 |
| 2019/0310359 A1* | 10/2019 | Lee | G01S 13/86 |
| 2019/0327765 A1* | 10/2019 | Mukherjee | H04W 16/14 |
| 2019/0339388 A1* | 11/2019 | Crouch | G01S 17/89 |
| 2019/0361122 A1* | 11/2019 | Crouch | G01S 7/487 |
| 2020/0081110 A1* | 3/2020 | Nam | G01S 13/42 |
| 2020/0132811 A1* | 4/2020 | Goswami | G01S 7/415 |
| 2020/0191939 A1* | 6/2020 | Wu | G01S 7/354 |
| 2020/0305010 A1* | 9/2020 | Hadani | H04L 25/022 |
| 2020/0341134 A1* | 10/2020 | Roger | G01S 7/352 |
| 2021/0003701 A1* | 1/2021 | Sturm | G01S 13/93 |
| 2021/0055374 A1* | 2/2021 | Dokhanchi | G01S 7/006 |
| 2021/0255279 A1* | 8/2021 | Goswami | G01S 7/415 |
| 2021/0278536 A1* | 9/2021 | Crouch | H04B 10/516 |
| 2021/0356579 A1* | 11/2021 | Iida | G01S 13/42 |
| 2022/0171021 A1* | 6/2022 | Liu | G01S 7/354 |
| 2022/0252697 A1* | 8/2022 | Rennhard | G01S 7/415 |

* cited by examiner

SYSTEM, DEVICE AND METHOD FOR EFFICIENT MIMO RADAR

CROSS REFERENCES TO RELATED APPLICATIONS

This application claims priority from Indian patent application No.: 202041042277 filed on Sep. 29, 2020 which is incorporated herein in its entirety by reference.

BACKGROUND

Technical Field

Embodiments of the present disclosure relate generally to Radar and more specifically to a system, device and method for efficient MIMO Radar

Related Art

Radar systems are generally employed for object detection, tracking and terrain mapping. Radar systems are increasingly used in various automotive applications such as driver assistance, obstacle detection, avoidance, and navigation of drones/UAVs for example. As is well known, Radars can detect surrounding obstacles or objects and send the relevant information like distance, relative position, direction and velocity of the object(s) that are in motion or still to a controller/central processor (software or hardware) or to a decision making unit in the automotive device like UAV, drone, driver assistance.

In a frequency modulated continuous wave (FMCW) radar system, the radar signal transmitted through antennas is in the form of a varying frequency signal of a fixed duration referred to as chirp that is often generated by a local oscillator, as is well known in the art. In that, received signal (the signal reflected from the object(s)) is mixed with the local oscillator chirp signal to generate a frequency tone(s) representing the range and/or the velocity of the object(s). In some radar systems multiple input multiple output (MIMO) antenna arrays are employed to transmit and receive Radar signal. In that, multiple chirps are transmitted over the antenna arrays by time division multiplexing. The MIMO antennas enable determination of angle of arrival (azimuth and elevation angle) as is well known in the art.

Conventional radars employing MIMO antennas and the conventional techniques thereof are more fully described in the U.S. Pat. No. 9,448,302, US patent Publication US20190011547 and article titled "Ambiguity elimination in HF FMCW radar systems", authored by M. Musa et al, published by September 2000, IEE Proceedings—Radar Sonar and Navigation 147(4):182-188, that are incorporated herein by reference. The conventional radar suffers at least from range ambiguity, velocity ambiguity, range—resolution trade off, angular resolution trade off, for example.

SUMMARY

According to an aspect, a radar system comprising a transmitter operative to transmit a first set of chirps on a single transmit antenna and a second set of chirps on a plurality of transmit antennas, in that, the first set of chirps forming a first part of a chirp frame and the second set of chirps forming a second part of the chirp frame, a first receiver segment operative to generate a first set of parameters from a first set of received chirps that is reflection of the first set of chirps from one or more objects and a second segment operative to generate a second set of parameters from a second set of received chirps that is reflection of the second set of chirps from the one or more objects and the first set of parameters, wherein, first set of parameters and second set of parameters comprise at least one of range Doppler and angle of the one or more objects.

According to another aspect, in the radar system the second receiver segment comprising a range processor operative to perform Fast Fourier Transform (FFT2) on plurality of samples of the second set of received chirps to generate first set of range bins and a spectral estimator operative to generate angle and magnitude for each doppler in the first set of range bins by applying the first set of parameters.

According to yet another aspect, in the radar system the first receiver segment comprising an RD (Range Doppler) processor operative to perform Fast Fourier Transform (FFT) on plurality of samples of the first set of received chirps to generate plurality of range bins and another FFT transformation on the plurality of range bins to generate plurality of Doppler bins and a RD selector operative to select the first set of parameters comprising a set of range bins and a set of Doppler bins in the plurality of range bins and the plurality of Doppler bins above a threshold.

According to yet another aspect, in the radar system the second set of chirps are divided into plurality of groups of chirps, corresponding in numbers to the plurality of transmit antennas, wherein chirps of each group are transmitted over corresponding one of the transmitter antenna in the plurality of antennas.

Several aspects are described below, with reference to diagrams. It should be understood that numerous specific details, relationships, and methods are set forth to provide a full understanding of the present disclosure. One who skilled in the relevant art, however, will readily recognize that the present disclosure may be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 1:
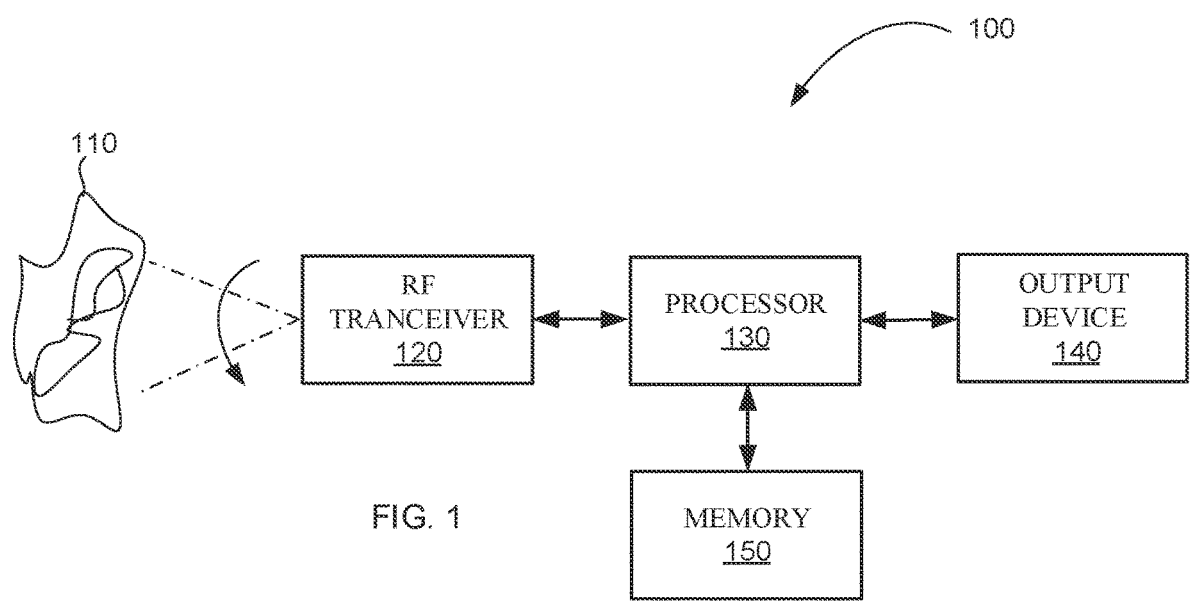
FIG. 1 is a block diagram of an example system 100 (environment) in which various aspects of the present invention may be seen.

FIG. 1 is a block diagram of an example system 100 (environment) in which various aspects of the present invention may be seen. The environment is shown comprising objects 110, Radio Frequency (RF) transceiver 120, processor 130, output device 140 and memory 150. Each element in the system 100 is further described below.

RF transceiver 120 transmits a radar (RF) signal over a desired direction(s) and receives a reflected radar signal that is reflected by the object 110. In one embodiment, the RF transceiver 120 may employ multiple (one or more) receiving antennas to receive the reflected RF signal and multiple (one or more) transmitting antenna for transmitting the radar signal. Accordingly, the transceiver 120 may employ these multiple transmitting/receiving antennas in several of multiple input and multiple output (MIMO) configurations to form desired transmitting and receiving RF signal beam (often referred to as Beam forming) to detect objects from the reflected signal. The objects 110 may comprise a terrain, terrain projections, single object, cluster of objects, multiple disconnected objects, stationary object, moving object, live objects etc.

Processor 130 conditions and processes the received reflected RF signal to detect one or more objects (for example 110) and determines one or more properties of the objects. The properties of the object thus determined (like shape, size, relative distance, relative velocity, location, azimuth and/or elevation angels etc.) are provided to the output device 140. In an embodiment, the processor 130 comprises signal conditioner to perform signal conditioning operations and provides the conditioned RF signal for digital processing. The memory 150 may store RF signal like samples of the reflected RF signal for processing. The processor 130 may temporarily store received data, signal samples, intermediate data, results of mathematical operations, etc., in the memory 150 (such as buffers, registers). In an embodiment, processor 130 may comprise group of signal processing blocks each performing the specific operations on the received signal and together operative to detect object and its characteristics/properties.

The output device 140 comprises navigation control electronics, display device, decision making electronic circuitry and other controllers respectively for navigation, display and further processing the received details of the object. Accordingly, the system 100 may be deployed as part of unmanned vehicles, driver assistant systems for example for obstacle detection, navigation and control and for terrain mapping.

In an embodiment, the RF transceiver 120, processor 130, and memory 150 are implemented as part of an integrated circuit (chips) integrated with other functionality and/or as a single chip integrated circuit with interfaces for external connectivity like the output device 140. The manner in which the transceiver 120 and the processor 130 (together referred to as Radar transceiver) may be implemented in an embodiment is further described below.

Figure 2:
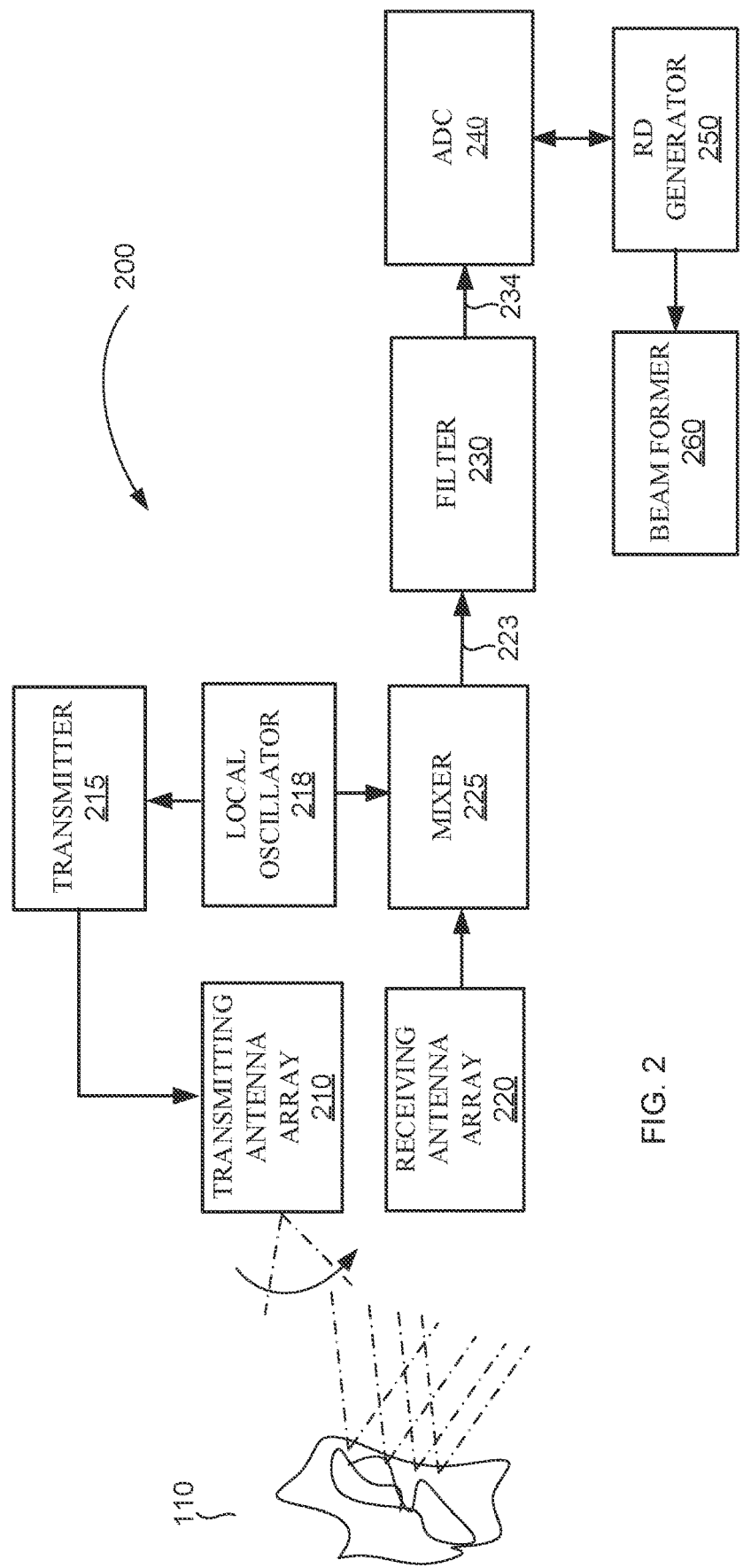
FIG. 2 is an example Radar transceiver for object detection and recognition in an embodiment.

FIG. 2 is an example Radar transceiver for object detection and recognition in an embodiment. The Radar transceiver 200 is shown comprising transmitting antenna 210, transmitter block 215, local oscillator 218, receiving antenna array 220, mixer 225, filter 230, Analog to digital convertor (ADC) 240, Range and Doppler (RD) generator 250, beamformer 260. Each element is described in further detail below.

The transmitting antenna array 210 and the transmitter 215 operate in conjunction to transmit RF signal. The antenna elements in the transmitting antenna array may be arranged in one dimension or two dimensional arrays. Local oscillator 218 generates modulated signal/radar signal (for example chirps) and provides the same to the transmitter 215 and mixer 225. The transmitter 215 arranges/selects the transmitting antennas for transmitting the radar signal and provides the same to the transmitting antenna array for transmission. The transmitting antenna array 210 is employed to form number of transmitting channels. In one embodiment, the transmitting antenna array may also be employed to form a transmit beam with an antenna aperture to illuminate objects at suitable angle. The receiving antenna array 220 receives reflected RF signal. The receiving antenna elements may be arranged in one or two dimensional array. The RF signal received on each element is provided to the mixer 225.

The Mixer 225 mixes RF signal received on receiving antenna array 220 with the local oscillator 218 generated radar signal to generate an intermediate frequency signal (IF signal/base band signal). In that the mixer 225 may comprise number of mixers to mix each RF signal received on the corresponding antenna elements. The intermediate frequency signal is provided on path 223 to filter 230. The filter 230 passes the IF signal attenuating the frequency components outside the band of interest (such as various harmonics) received from the mixer. The filter 230 may be implemented as a band pass filter to pass a desired bandwidth (in conjunction with chirp bandwidth BW). The filtered IF signal is provided on path 234 to ADC 240.

The ADC 240 converts IF signal received on path 234 (analog IF signal) to digital IF signals. The ADC 240 may sample the analog IF signal at a sampling frequency $F_s$ and convert each sample value to a bit sequence or binary value. In one embodiment the ADC 240 may generate 256/512/1024 samples per chirp signal. The digitised samples of IF signal (digital IF signal) is provided for further processing.

The beamformer 260 determine the angle of arrival of the reflected RF signal or elevation and Azimuth angle of object 110, in one embodiment, a range and Doppler processed output is provided to beamformer to determine the azimuth and elevation angle by performing beam forming over the receiving antennas. For example, the beamformer 260 may perform FFT (Finite Fourier Transform) across set of receiving antennas. Beam former 260 may also be implemented using different techniques to determine the angle of the objects 110.

The Range and Doppler (RD) generator 250 generates plurality of ranges and Doppler (velocities) corresponding/representing plurality of objects 110 and provides the determined range and Doppler to the Beamformer 260. The manner in which the range and Doppler generator 250 may be implemented in an embodiment is further described below.

Figure 3C:
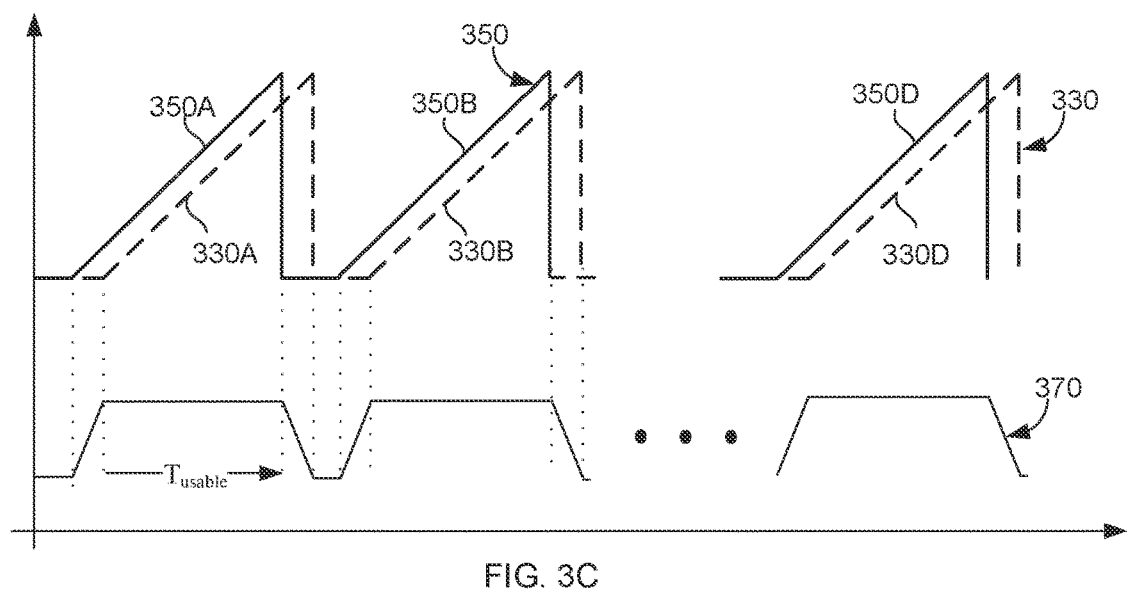
FIG. 3C illustrates example received signal.
Figure 3A:
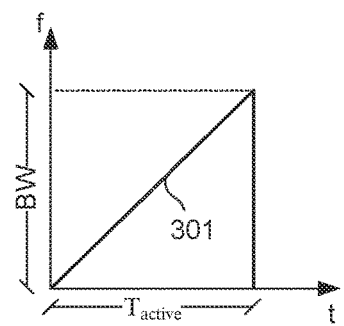
FIG. 3A illustrates an example chirp.
Figure 3B:
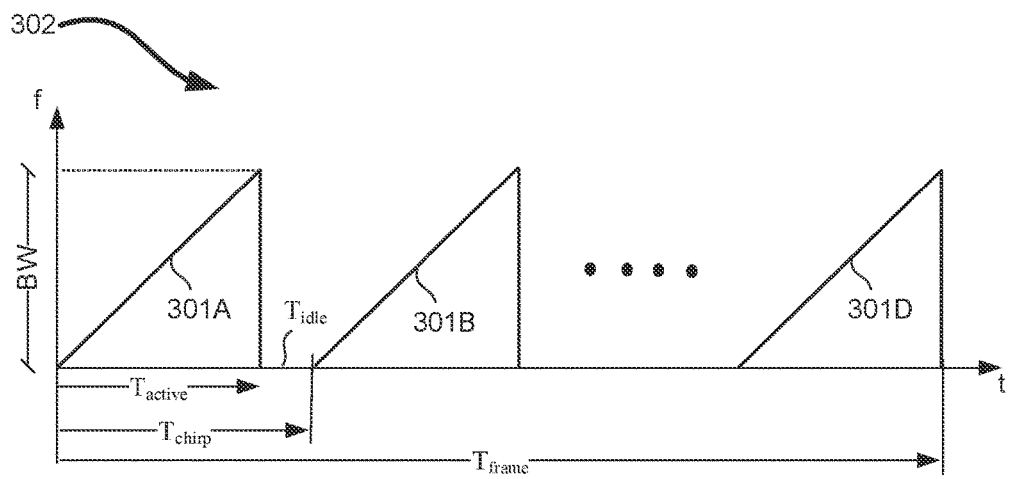
FIG. 3B illustrates a frame comprising sequence of chirps.

FIG. 3A illustrates an example chirp, in that, the chirp 301 is shown as linearly increasing frequency signal with a slope δ, chirp Bandwidth BW, active chirp width $T_{active}$, in that the slope $δ=BW/T_{active}$. FIG. 3B illustrates a frame comprising sequence of chirps. As shown there, the frame 302 comprises D number of Chirps 301A-301D repeated at chirp period $T_{chip}$ to form a frame of duration $T_{frame}$. In that, the chirp duration $T_{chip}$ is shown equal to ($T_{active}+T_{idle}$) and may be referred to as chirp width $T_{chip}$. The frame 302 represents a radar signal for transmission over the transmitting antenna array 210.

FIG. 3C illustrates example received signal 330 corresponding to the transmitted radar signal 302. As shown there the received radar signal 330 (reflected from objects 110) is depicted against the local oscillator signal 350 that is local reference signal generated by the local oscillator 218 (same as the transmitted signal 302). The received signal 330 is shown shifted in time with respect to the local reference signal 350.

The example IF signal 370 generated by mixing signal 330 and 350 in the mixer 225. The IF signal 370 is shown comprising usable time width $T_{usable}$ of the chirp. The IF signal 370 is provided to ADC 240.

Figure 4:
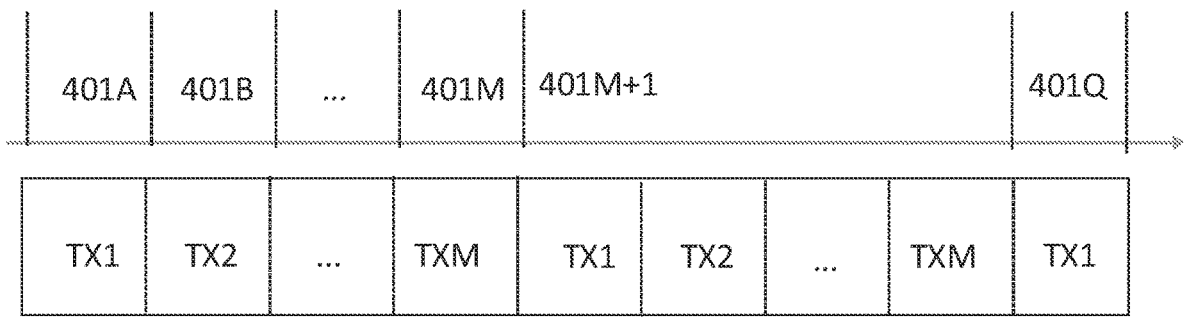
FIG. 4 illustrates an example conventional time division multiplexed chirps among the transmit antennas.
Figure 5A:
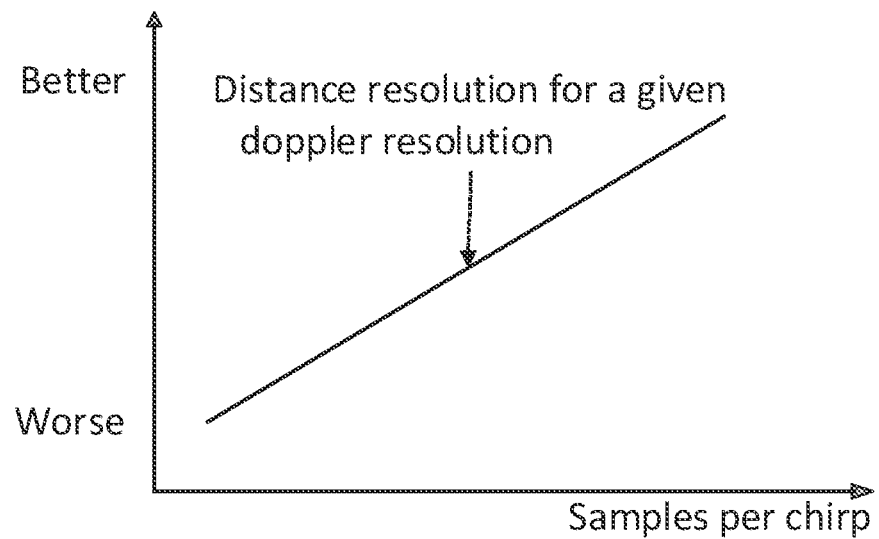
FIG. 5A-5C illustrates example disadvantages associated with the conventional radar systems.
Figure 5B:
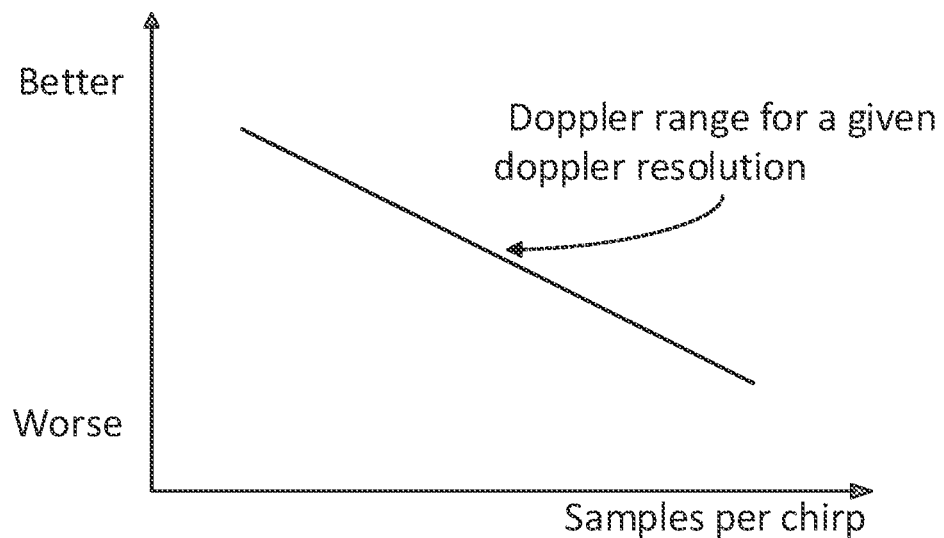
Figure 5C:
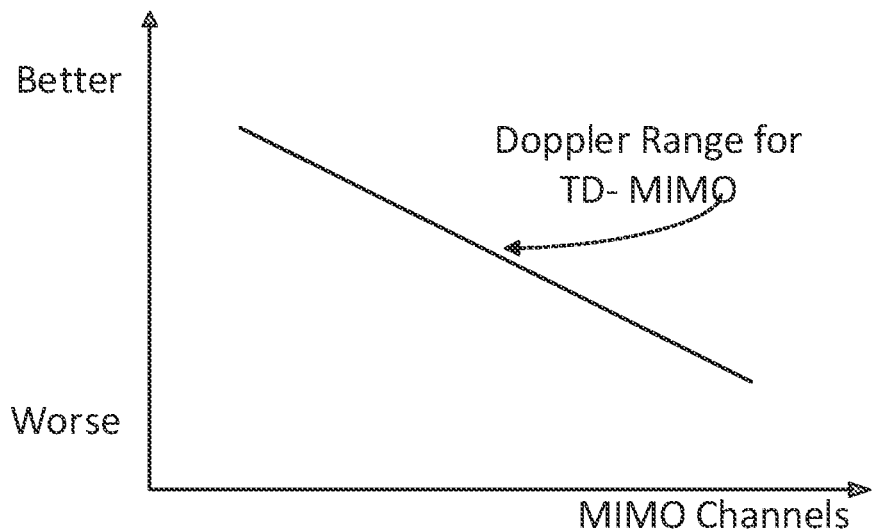

In conventional radar systems, the number of samples per chirp (at the sampling rate of an ADC) are FFT transformed to generate distance/range bins. Thus, number of distance (range) bins may be obtained in each chirp. Each distance bin in the chirp is subjected to second FFT transformation across the chirps in the frame to generate Doppler bins. That is, number of Doppler bins may be formed by the second FFT transformation. Thus, generating Range and Doppler. Further, in conventional MIMO radar, an additional FFT transformation is performed for each range and/or Doppler bin across multiple antennas to determine the angle of arrival or direction of arrival. Further, conventionally, a MIMO radar is implemented with a set of transmit antennas and a set of receive antennas. In that the number of chirps in the frame is time division multiplexed among the set of transmit antennas for transmission. FIG. 4 illustrates an example conventional time division multiplexed chirps among the transmit antennas. As shown there, the chirp 401A is transmitted over transmit antenna Tx1, chirp 401B is transmitted over Transmit antenna Tx2 and chirp 401M is transmitted over TxM antenna, chirp 401M+1 is transmitted over transmit antenna Tx1 and so on. Thus, Q number of chirps (401A-Q) are transmitted by interleaving the transmit antenna/channels. This conventional scheme of interleaving maintains constant Doppler resolution for any value of M by sacrificing maximum unambiguous Doppler range. FIG. 5A-5C illustrates example disadvantages associated with the conventional radar systems and/or conventional time division MIMO radar system. In FIGS. 5A and 5B, the X-axis represents number of (ADC) samples per chirp for a given ADC sampling rate and chirp slope (and/or inverse of number of chirps in the frame) and Y-Axis represents performance of parameters in the respective graphs. As may be seen in FIG. 5A, for a given chirp slope and Doppler resolution, the distance resolution is better for higher number of samples per chirp, i.e. distance resolution is directly proportional to the number of (ADC) samples per chirp or inversely proportional to number of chirps in a frame. Similarly, in FIG. 5B, for a given Doppler resolution and sampling rate, the unambiguous Doppler range is better when the number of (ADC) samples per chirp are lower, i.e. Doppler range is inversely proportional to the number of samples. In FIG. 5C, the X-axis represents the number of MIMO channels (or angular resolution). As shown there, in conventional time division multiplexed MIMO radar system, for a given frame time, Doppler range decreases with angular resolution (number of MIMO channels). Prior arts referred to in the related art section suffer from one or more disadvantages of the conventional radar systems.

In one embodiment, the radar system 100, 200 is implemented to overcome at least some of the disadvantages of the conventional radar systems. The manner in which the radar transceiver 200 may be implemented in an embodiment is further described below.

Figure 6:
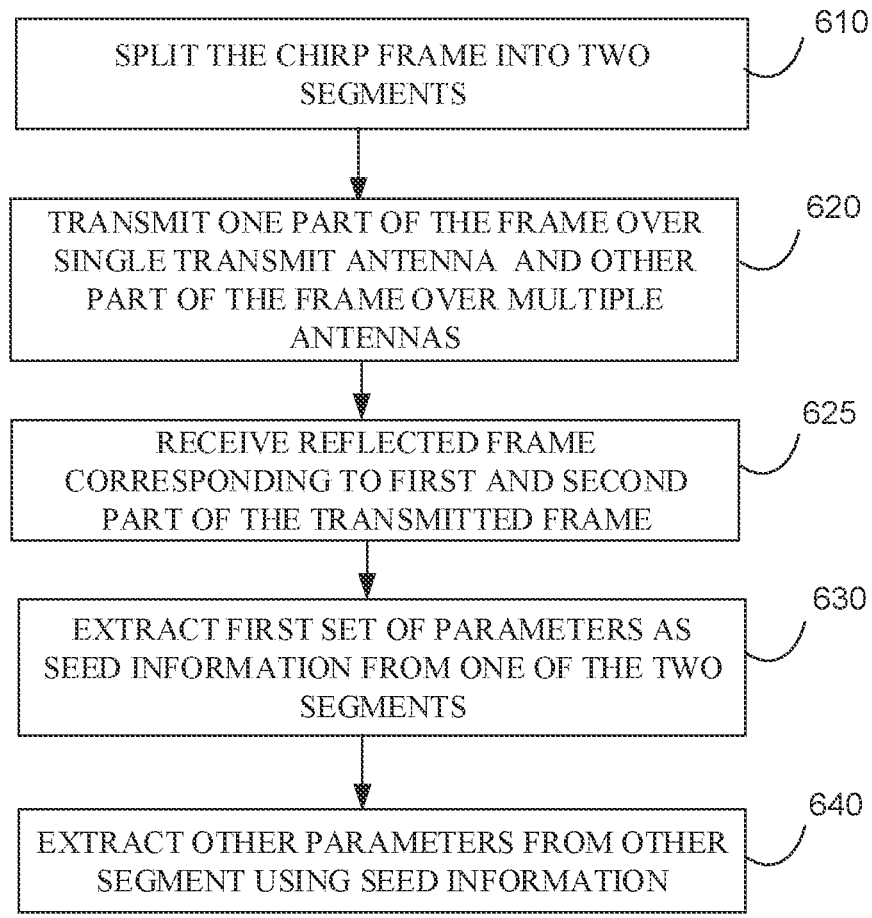
FIG. 6 is a block diagram illustrating the manner in which the radar system may be implemented in one embodiment.

FIG. 6 is a block diagram illustrating the manner in which the radar system may be implemented in one embodiment. In block 610, the available frame time is split into two parts. For example, in the frame 302 of D chirps, the first part may comprise first P number of chirps and the second part may comprise remaining chirps (D-P) number of chirps.

In block 620, the first part of the frame 302 is transmitted over a single transmit antenna and the second part of the frame 302 is transmitted over multiple antennas. The single transmit antenna may also comprise (or mean) an analog-beam formed transmit antenna(s). In block 625, the reflected signal frame 330 is received that is reflected from object 110 corresponding to transmitted frame 302.

In block 630, one of the two parts of the frame 330 is processed to extract first set of parameters referred to as seed information. For example, the first part of the received signal 330 corresponding to the transmitted first part of P chirps may be processed to extract range and Doppler. That is, N number of ADC 240 samples per chirp is FFT transformed to obtain the range bins and each range in the range bins is FFT transformed across P chirps to obtain the Doppler bins (velocities/Doppler frequencies). The Doppler frequency comprises the frequency component, magnitude and phase angle (or phase). In that, the magnitude and phase corresponds to the MIMO channel on which the radar signal is operated. For example, in this case, the phase and magnitude corresponds to the single transmit antenna on which the first part of the chirp frame 302 is transmitted and the receive antenna on which the reflected frame 330 is received. The range and the Doppler represent the seed information from the first part of the received frame, for example. This seed information is provided to block 640, in that the chirps of the second part of the frame 330 (corresponding to transmitted second part of the frame) are processed using the seed information to extract the remaining parameters and/or improve the first set of parameters. Unlike the conventional MIMO radar, the chirps are not interleaved among the transmit antennas, avoiding any degradation to Doppler range. The parts lengths are selected based on the signal to noise ratio (SNR) required for detecting the first set of parameters and SNR required for extracting the other parameters from the second part using the seed information available. Further, the transmitter or antenna employed for transmitting the first part chirps may be different from the antenna selected in the second part. Further, remaining MIMO transmitters may be employed for second part to extract the angles. The radar system of the present embodiment is further described below with examples.

Figure 7:
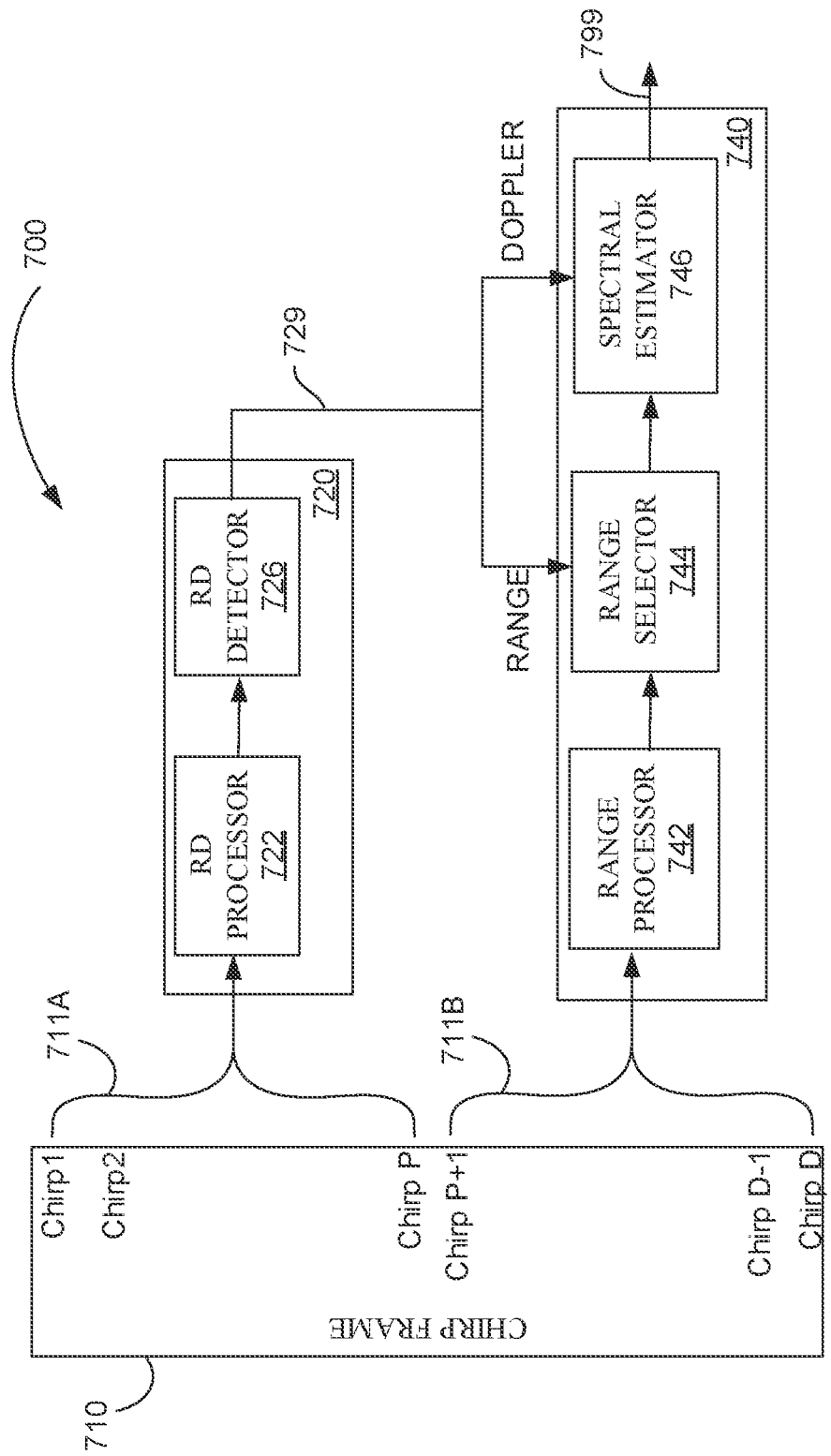
FIG. 7 is a block diagram of an example radar transceiver in an embodiment.

FIG. 7 is a block diagram of an example radar transceiver in an embodiment. The example radar 700 is shown comprising baseband chirp frame with D chirps 710, first segment 720 and second segment 740. In that, the first segment 720 is shown comprising Range Doppler (RD) processor 722 and valid RD detector 726. Similarly, the second segment 740 is shown comprising range processor 742, range selector 744, and spectral estimator 746. Each element is further described below.

The baseband D chirps 710 are the digital samples provided from ADC 240 of D chirps of the received frame 330. The received frame 330 represents the reflection of transmitted signal 302 from the objects 110. In one embodiment, the transmitter 215 transmits first P number of chirps (referred to as first part) on one/single transmit antenna and remaining chirps on the multiple antennas (referred to as second part). In this, content, single antenna may mean/include the analog beam forming antenna(s). Correspondingly, the baseband D chirps 710 may be buffered as first part 711A and second part 711B for processing separately by the first segment 720 and the second segment 740 respectively, or alternatively, may be dynamically switched between the first segment 720 and the second segment 740. Buffer and switching mechanisms to separate the chirps into first part 711A and the second part 711B and/or feeding to the first segment 720 and the second segment 740 are not shown for conciseness.

The first segment 720 operates on the first part 711A of the chirp frame 710 to generate range and Doppler as seed information. In one embodiment the Range Doppler (RD) processor 722 performs range and Doppler detection by performing FFT transformation of the ADC samples of the first part 711A of the frame 710. The FFT transformations of the samples generate range bins and further FFT generates corresponding Doppler bins. The Doppler in the Doppler bins comprises frequency, magnitude, and phase. In that, frequency represents the velocity, magnitude represents the signal strength and phase represents the relative phase of the object as seen by the transmit/receive antenna pair. The generated range and Doppler bins are provided to (valid) RD detector 726.

The (valid) RD detector 726 selects valid ranges and Doppler from the range and Doppler bins by applying a threshold. Thus, RD detector 726 provides only the valid ranges and Doppler as the seed information on path 729 to the second segment 740. In one embodiment, the range bins (valid range values) and Doppler(s) (valid frequency values) are provided to the second segment 740.

The second segment 740 operates on the second part 711B of the chirp frame 710 to determine other parameters like phase and magnitude of the Doppler frequencies. For example, in the second segment, the range processor 742 generates range bins using the second part 711B of the frame data 710. The range selector 744 selects valid ranges based on the seed information received from the first segment 720. For example, when the range processor 742 produces range bins from the second part 711B of the frame 710, the range bins thus produced are correlated with the seed information (ranges) by the range selector 742 to select the valid ranges. The selected ranges are provided to the spectral estimator 746 for determining the phase and magnitude of each Doppler frequency indicated in the seed information. The spectral estimator 746 estimates the phase and magnitude of Doppler frequencies provided as seed information for each selected range. As shown there, the valid ranges (distance) part of the seed information is provided to the range selector 744 and the Doppler part of the seed information is provided to the spectral estimator 746 for estimating the phase and magnitude. The output of 746 is provided on path 799 for further processing, for example, delay compensation and Angle of arrival processing. The Radar system 700 is further described below with an illustration.

Figure 8:
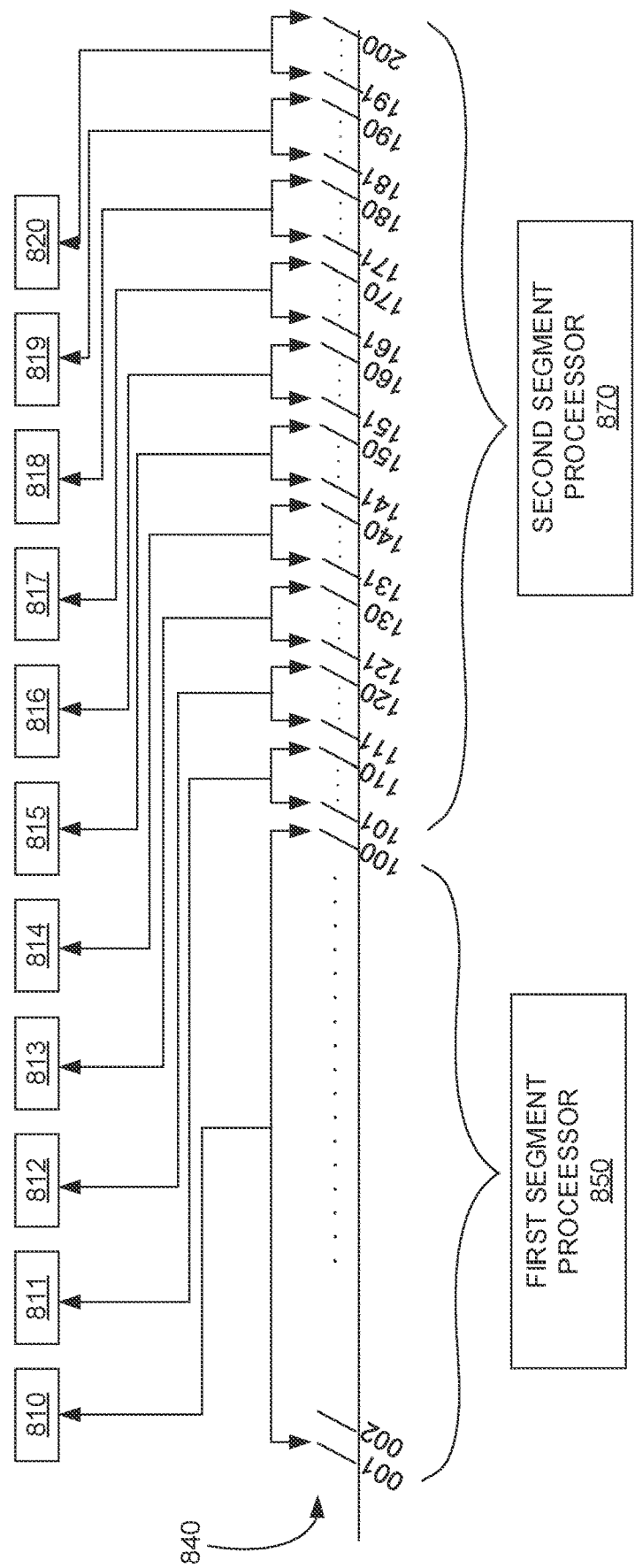
FIG. 8 illustrates an example radar system in one embodiment.

FIG. 8 illustrates an example radar system in one embodiment. The Radar system is shown (as an example and convenience of illustration) comprising eleven transmitter antennas 810-820, frame 840 comprising 200 numbers of chirps, first segment 850 and second segment 870. The first part is shown comprising 1-100 chirps and second part is shown comprising 101-200 chirps. The first part 1-100 chirps are shown being transmitted on transmit antenna 810 and the remaining chirps 101-200 are transmitted over remaining transmit antennas 811-820. As shown there, chirps 101-110 are transmitted over antenna 811, chirps 111-120 are transmitted over antenna 812 and so on and finally the chirps 191-200 are transmitted over antenna 820. Thus not interleaving the chirps for transmission over the antennas.

The first segment processor 850 operates on the received chirps (corresponding to transmitted 1-100 chirps) in a similar manner to the part 720 and the second segment processor 870 operates on the received chirps (corresponding transmitted 101-200 chirps) similar to the part 740 in FIG. 7. Accordingly, the first part 850 generates range and Doppler with Doppler range higher than any conventional system where the chirps are interleaved among antennas. For example, the first segment 850 performs the FFT on the samples of first part to generate ranges and perform another FFT to generate Doppler(s). In that, the first segment 850 performs the operations using X/2 samples as against X/11 samples in the second segment, where X representing the total number of samples across the frame 840 at sampling frequency Fs of the ADC 240. Thus, due to larger number of samples over fixed chirp frame time, higher Doppler resolutions is obtained without sacrificing Doppler range. Thus, segment 850 generates ranges and Dopplers with Doppler phase and magnitude related to the transmit antenna 810 (corresponding one MIMO Channel). The range and higher resolution Doppler are given to the second segment (like on path 729).

The second segment 870 operates on the chirps received corresponding to transmitted chirps 101-200. The second segment performs first level of FFT operation to generate ranges (range bins). The Doppler FFT processing, if done for the second segment will have lesser resolution as the number of samples per antenna is reduced. However, a high Doppler resolution for valid ranges are already determined in first segment, the high resolution Doppler signals phase and magnitude is extracted from the second segments by correlating with the seed information from the first segment. The high resolution Doppler's in the seed information from the first segment 850/720 are employed to determine the phase and magnitude of each Doppler frequency in the selected range bins in the second segment. The manner in which the phase angle is determined in an embodiment is further described below.

In one embodiment, the second segment 740/870 performs spectral coefficient estimation techniques to determine the phase and magnitude of the Doppler frequencies from second part of the frame. In one embodiment, the phase and magnitude of the ranges are determined using relation:

$$\begin{pmatrix} x_0 \\ x_1 \\ x_2 \\ \vdots \\ x_{(p-1)} \end{pmatrix} = \begin{pmatrix} w^0 & w^0 & & w^0 \\ w^0 & w^1 & \cdots & w^{1(k-1)} \\ w^0 & w^2 & & w^{2(k-1)} \\ \vdots & & \ddots & \vdots \\ w^0 & w^{p-1} & \cdots & w^{(p-1)(k-1)} \end{pmatrix} \begin{pmatrix} a_0 \\ a_1 \\ a_2 \\ \vdots \\ a_{(p-1)} \end{pmatrix} \quad (1)$$

Or $$x = Wa,$$

in that, x representing the Doppler samples of ranges selected by the range selector 744, a representing the magnitude and phase of the Doppler frequencies, W representing a matrix derived from the Doppler in the seed information, k representing number of Doppler bins in the seed information, and p representing number of chirps per antenna in the second part. In the W matrix, the subset of all the k columns will be dictated by the Doppler frequency detected by the first segment 720. From the relation x=Wa, the phase and magnitude information may be determined as $a=W^{-1}x$. In that, $W^{-1}$ representing the inverse of matrix W. The relation 1 is applied for every antenna 811-820 in the second segment to determine the corresponding magnitude and phase value of the seed Doppler (Doppler from seed information) in the MIMO operations. The phase and magnitudes of Doppler corresponding 10 antennas 811-820 and the phase and magnitude of antenna 810 determined in the first segment 850 are provided for beamforming.

In one embodiment the weights of the W matrix may be determined from the Doppler frequency $e^{2\pi f_{di} T_{chirp} k}$, in that $f_{di}$ representing the $i^{th}$ Doppler frequency and $T_{chirp}*k$ varies from $T_{chirp}$, $T_{chirp}*2$, ... $T_{chirp}*p$ for p Doppler chirps.

Since the phase and magnitude are determined using spectral estimation techniques employing higher resolution Doppler frequency information, the Radar performance of the range, Doppler and phase angles are unaffected by the MIMO antennas and are superior to the performance of the conventional Radar system, as the range and Doppler are determined using single transmit channel, thus, avoiding any Doppler compensation requirement. Further, the range and Doppler are of higher resolution as they are determined from first part where a larger number of samples are employed as against conventional time division MIMO interleaved radar system. Further, the phase and magnitude determination is performed (in the MIMO configuration) using the spectral coefficient estimation techniques, it is free from the low Doppler resolution and Doppler ambiguity at least when determining the plurality objects.

Figure 9:
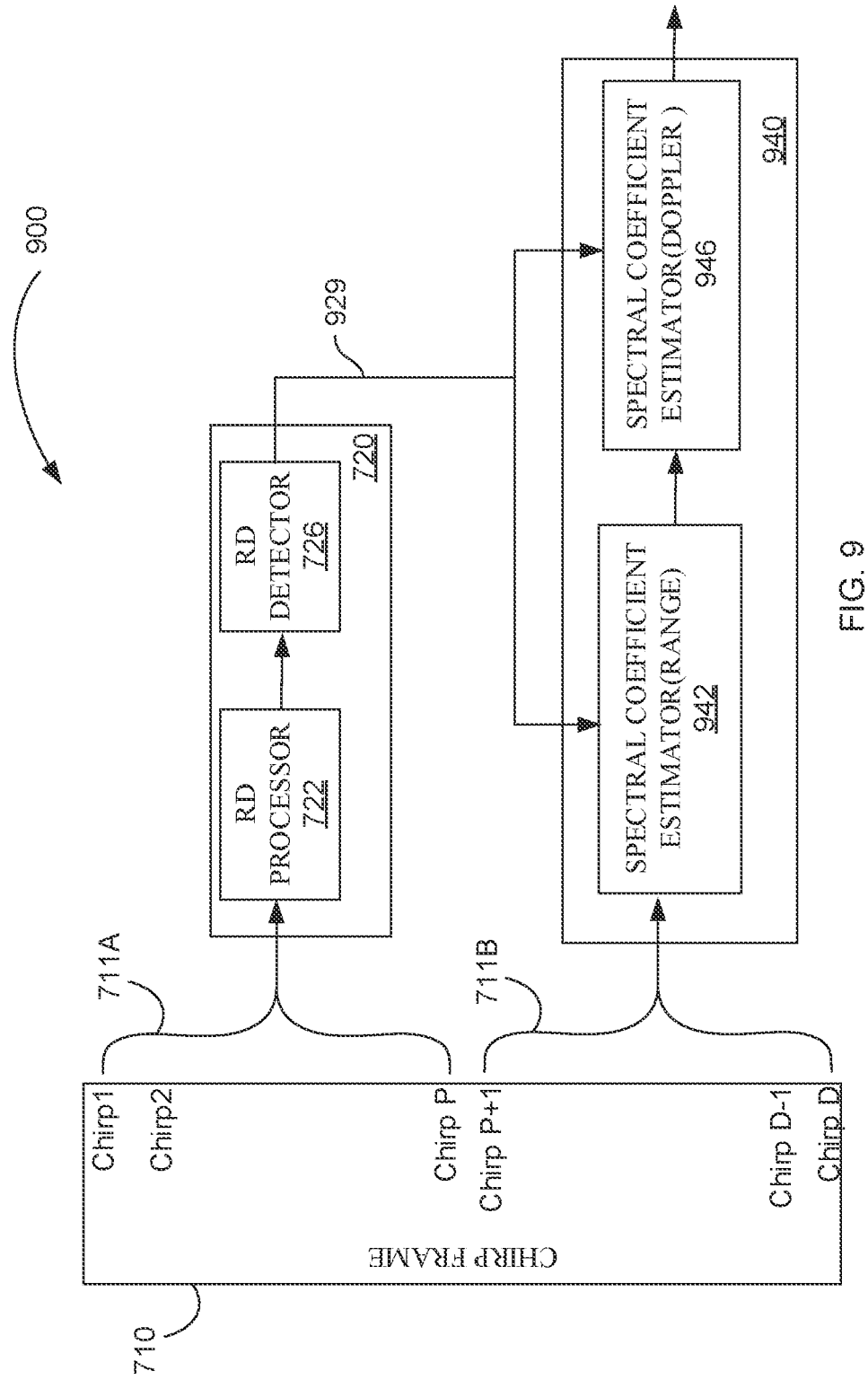
FIG. 9 illustrates and alternative embodiment of the system.

FIG. 9 illustrates and alternative embodiment of the system 700. The reference numerals maintained from FIG. 7 represents similar operations. As shown there, the Radar system 900 generates seed information similar to the system 700. The second segment 940 is shown comprising spectral coefficient estimator (range) 942 and the spectral coefficient estimator (Doppler) 946. The range data in the seed information is provided to block 942 and Doppler data in the seed information is provided to block 946. The spectral coefficient estimator (range) 942 generates valid ranges using relation similar to the relation (1), in that the number of samples per chirp in the second segment may be lower than that in the first segment and not suffer from range resolution loss due to the use of seed information for range processing. For example, the weights of the matrix W are determined from the range values in the seed information. The spectral coefficient estimator (Doppler) 946 performs operation similar to the block 746. Thus, the second segment does not perform conventional FFT operations on the samples to generate the ranges information.

While various examples of the present disclosure have been described above, it should be understood that they have been presented by way of example, and not limitation. Thus, the breadth and scope of the present disclosure should not be limited by any of the above described examples, but should be defined in accordance with the following claims and their equivalents.

What is claimed is:

1. A radar system comprising:
   a transmitter operative to transmit a first set of chirps on a single transmit antenna and a second set of chirps on a plurality of transmit antennas, in that, the first set of chirps forming a first part of a chirp frame and the second set of chirps forming a second part of the chirp frame;
   a first receiver segment operative to generate a seed information from a first set of received chirps that is reflection of the first set of chirps from one or more objects; and
   a second receiver segment operative to generate a second set of parameters from a second set of received chirps and the seed information, in that the second set of received chirps are reflection of the second set of chirps from the one or more objects,
   wherein, the seed information comprises at least one of range and Doppler, and the second set of parameters comprises the phase and magnitude of said Doppler.

2. The radar system of claim 1, wherein the second receiver segment comprising:
   a range processor operative to perform Fast Fourier Transform (FFT) on plurality of samples of the second set of received chirps to generate a first plurality of range bins;
   a range selector selecting a first set of range bins in accordance with the seed information; and
   a spectral estimator operative to determine phase and magnitude of a first set of Doppler in the seed information applying the first set of range bins.

3. The radar system of claim 2, wherein the first receiver segment comprising:
   an RD (Range Doppler) processor operative to perform Fast Fourier Transform (FFT) on plurality of samples of the first set of received chirps to generate second plurality of range bins and to perform another FFT transformation on the second plurality of range bins to generate a plurality of Doppler bins; and
   a RD selector operative to select a second set of range bins and a first set of Doppler, that are above a threshold, from the second plurality of range bins and the plurality of Doppler respectively, in that seed information comprising the second set of range bins and the first set of Doppler.

4. The radar system of claim 1, wherein the second set of chirps are divided into plurality of groups of chirps, corresponding in numbers with the plurality of transmit antennas, wherein chirps of each group are transmitted over corresponding one of the transmit antenna in the plurality of antennas.

5. The radar system of claim 2, wherein the spectral estimator generates the angle and magnitude using relation:

$$\begin{pmatrix} x_0 \\ x_1 \\ x_2 \\ \vdots \\ x_{(p-1)} \end{pmatrix} = \begin{pmatrix} w^0 & w^0 & & w^0 \\ w^0 & w^1 & \cdots & w^{1(k-1)} \\ w^0 & w^2 & & w^{2(k-1)} \\ \vdots & \vdots & \ddots & \vdots \\ w^0 & w^{p-1} & \cdots & w^{(p-1)(k-1)} \end{pmatrix} \begin{pmatrix} a_0 \\ a_1 \\ a_2 \\ \vdots \\ a_{(p-1)} \end{pmatrix}$$

in that, $\alpha_0$ through $\alpha_{(p-1)}$ representing the magnitude and phase of the Doppler frequency corresponding to the first set of range bins for doppler samples $x_0$ through $x_{(p-1)}$ representing a matrix derived from Doppler frequencies in the set of Doppler bins.

6. The radar system of claim 4, wherein the second set of chirps are consecutive and transmitted on the plurality of transmit antennas without interleaving.

7. The radar system of claim 1, wherein the second receiver segment comprising:
   a first spectral coefficient estimator operative to generate a first set of range bins by applying the seed information and a plurality of samples of the second set of received chirps; and
   a second spectral estimator operative to determine phase and magnitude of a first set of Doppler in the seed information applying the first set of range bins.

8. A method of detecting plurality of objects in a radar system comprising:
   splitting a chirp frame into two parts, first part and a second part;

transmitting the first part over a single transmit antenna and the second part over a multiple antennas;

receiving a reflected frame corresponding to the first and the second part;

extracting a first set of parameters as seed information from a first part of the reflected frame that corresponds to the first part of the transmitted frame; and extracting other parameters from a second part of the reflected frame that corresponds to the second part of the transmitted frame, wherein, the seed information comprises at least one of range and Doppler, and the other parameters comprises the phase and magnitude of said Doppler.

* * * * *